Dec. 16, 1958 — E. NIEMAND — 2,864,443
TIMER MECHANISM
Filed Dec. 15, 1954 — 2 Sheets-Sheet 1
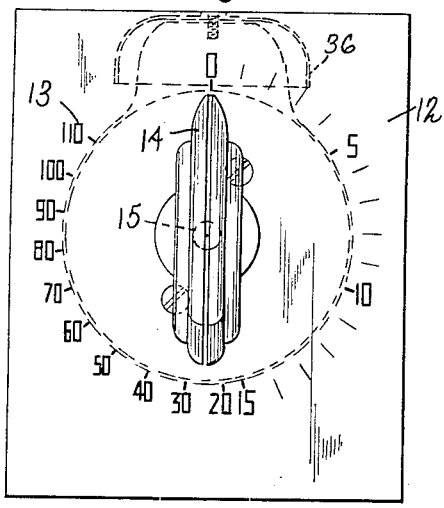
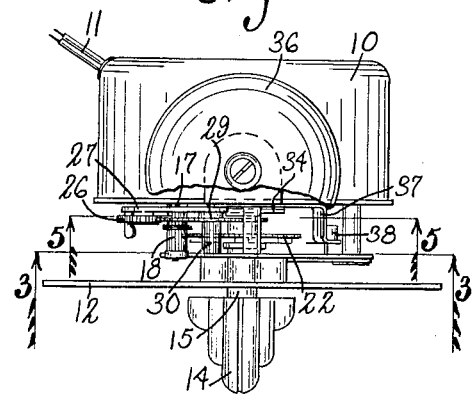
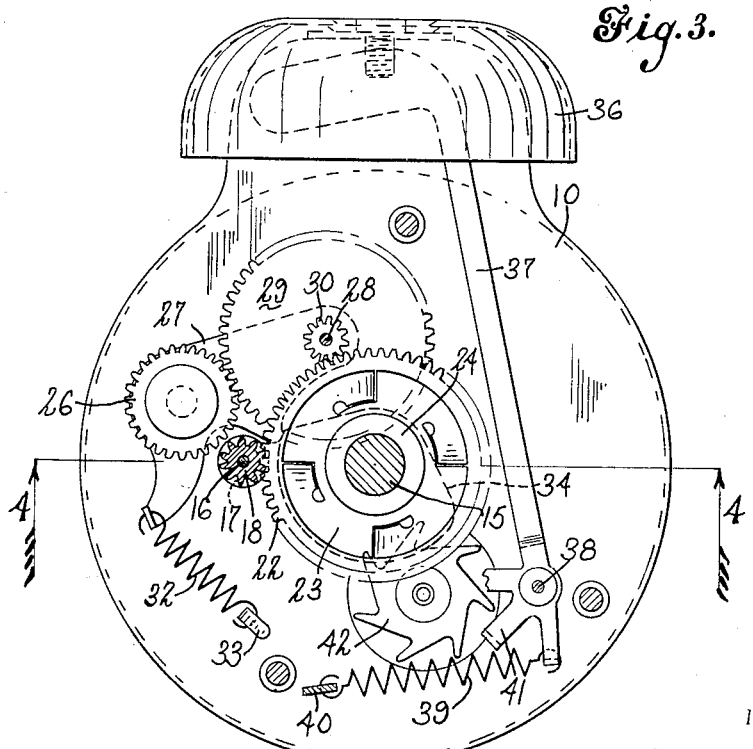
INVENTOR
Emil Niemand
BY Rockwell Brichton
ATTORNEYS Dec. 16, 1958     E. NIEMAND     2,864,443
TIMER MECHANISM
Filed Dec. 15, 1954     2 Sheets-Sheet 2
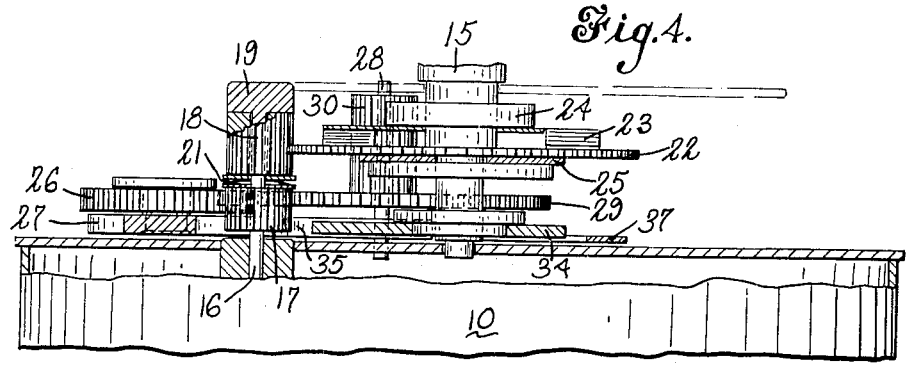
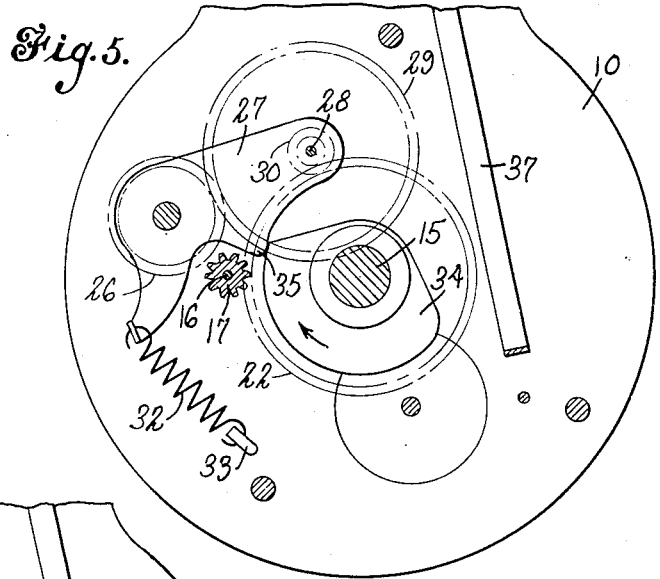
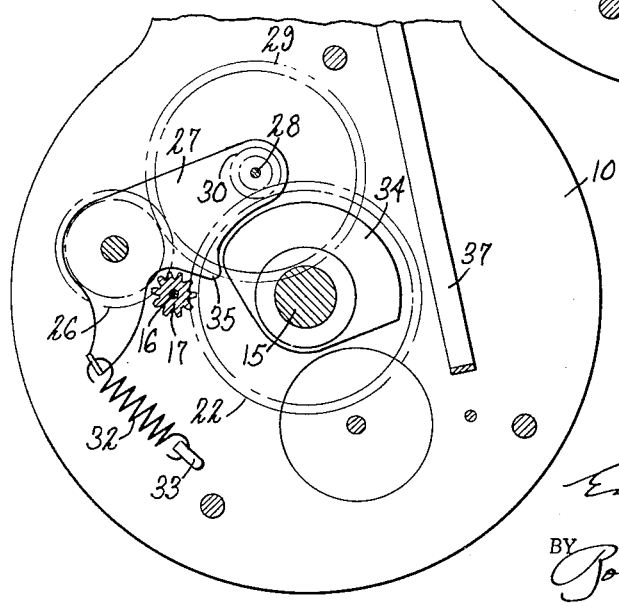
INVENTOR
Emil Niemand
BY Rockwell & Sanhston
ATTORNEYS

United States Patent Office 2,864,443
Patented Dec. 16, 1958

2,864,443

TIMER MECHANISM

Emil Niemand, Waterbury, Conn., assignor to The Lux Clock Manufacturing Company, Inc., Waterbury, Conn., a corporation of Connecticut Application December 15, 1954, Serial No. 475,427

8 Claims. (Cl. 161—15)

This invention relates to an interval timer and more particularly to a mechanism of this character which is suitable for properly measuring either short or longer intervals of time.

In many operations both in industry and in the home it is desirable to provide means for measuring a given time interval and actuating a signal at the end of such time interval to notify the user that the predetermined time has elapsed. Sometimes these time intervals are relatively short and in other instances they may be relatively long, and it is desirable to provide an interval timer which may be employed to measure either short or long intervals of time.

In the present instance the mechanism is one in which a time indicator or pointer is set by being rotated in one direction and a clockwork mechanism then comes into play to return the indicator to its original or 0 position. In such devices the indicator usually rotates over an arc of not more, and usually slightly less, than 360 degrees. It will be obvious that if this arc upon the dial or face of the mechanism is divided into relatively small spaces so as to be able to measure a long interval of time, the indicator may not be accurately set to measure small intervals of time. On the other hand, if the dial is so graduated that it is suitable for measuring small intervals of time, it will not be possible to measure long intervals in one, or less than one, revolution of the indicator.

It has, therefore, been proposed to so arrange the graduations or indicia upon the dial so that one portion of it is arranged for short time intervals while another portion is arranged for longer time intervals, in which case the indicator may be properly and accurately set for the short time intervals and may also be set, as accurately as is required, for the longer time intervals. It will, of course, be obvious that it is not required to observe as great accuracy in the setting for longer intervals as for shorter intervals.

It will also be obvious that it is necessary to adjust the speed with which the indicator is operated to the graduations upon the dial and, if these graduations are unequal, it will be necessary to operate the indicator at a greater speed over one portion of the dial than over another portion. The present invention particularly relates to a means for driving or rotating the indicator shaft at variable speeds during one complete revolution in that it may be operated at one speed over a certain portion of its travel or a certain number of degrees of its rotation and at another speed over the remainder of its rotation.

To this end the dial of the indicator is so graduated that it will measure relatively short intervals of time adjacent its zero or rest position and relatively long intervals of time at the portion of its travel remote from the zero position. Likewise the mechanism for driving the indicator is so arranged that when the indicator is moved through substantially its full arc of travel to be set for a long period of time, it will be returned relatively slowly during the first part of its return movement and relatively rapidly over the last part of such movement.

A motor is provided, illustrated herein as an electric motor, to drive the shaft upon which the rotatable indicator is mounted. The motor shaft is connected to the indicator shaft by two trains of gearing. The gears of one train are in constant mesh, but the gear of this train which is mounted upon the motor shaft is frictionally driven so that it can slip if the indicator shaft is driven at a different speed by the second gear train. The second gear train is so arranged that it may be thrown out of mesh, and means are provided to effect this unmeshing of the gears at a predetermined point in the rotation of the time indicator. As illustrated, this is done by means of a cam on the indicator shaft which acts upon an arm upon which one of the gears is mounted, this arm being arranged to swing about a pivot point so as to swing the gear mounted thereon out of mesh with its mating gear.

The indications on the dial with which the pointer co-operates will be differently spaced according to the speed of the indicating element so that where this element is driven at a relatively rapid speed, the indications will be spaced relatively far apart as compared with those over that part of the arc where the indications representing corresponding intervals of time will be relatively close together.

One object of the present invention is to provide a new and improved timing mechanism.

A further object of the invention is to provide a timer mechanism, the timing element of which will be driven at differential speeds so that one part of its movement may be employed for measuring relatively small time intervals with accurate results.

Still another object of the invention is to provide timing mechanism provided with a time indicator adapted to be driven through a substantially complete revolution and which is provided with mechanism to drive the indicator such that it will be driven during part of its movement at one speed and at a faster speed during another part of its movement.

A still further object of the invention is to provide a timer mechanism of the character above described in which the change in speed of the timing element will be effected automatically without any attention on the part of the operator.

To these and other ends the invention consists in the novel features and combinations of parts to be hereinafter described and claimed.

In the accompanying drawings:

Fig. 1 is a front elevational view of a timer mechanism embodying my improvements;

Fig. 2 is a top plan view thereof;

Fig. 3 is a sectional view on line 3—3 of Fig. 2;

Fig. 4 is a sectional view on line 4—4 of Fig. 3;

Fig. 5 is a diagrammatic sectional view on line 5—5 of Fig. 2; and

Fig. 6 is a view similar to Fig. 5 showing the parts in another position.

To illustrate a preferred embodiment of my invention I have shown in the drawings an interval timer comprising a casing 10 in which may be contained a motor, not shown. This motor may be of any type such as an electric motor served with current through the wires 11. Connected to the casing 10 is a dial plate 12 which may serve as the front of a casing if the timer is enclosed. This dial plate is provided with a scale or indicia indicating minutes of time, as shown at 13. It will be noted that these indicia are arranged in circular form so as to cooperate with a time indicator or pointer 14 mounted upon a rotatable shaft 15.

It may be noted that the indicia indicating the minutes from 0 to 15 are spaced relatively far apart in degrees about the arc upon the dial as compared to the spacing of the indicia indicating the minutes from 15 to 110. In accordance with this spacing the shaft 15 and indicator 14 carried thereby are adapted to be rotated relatively slowly over the upper part of the scale where a longer time interval is involved and rotated rather rapidly over the lower part of this scale where a relatively short time interval is involved. It will, of course, be understood that the complete arc of rotation of the pointer may be divided in any desired ratio between the rapid and slow areas of travel.

The shaft of the motor within the casing 10 is indicated at 16 (Fig. 4), and upon this shaft are mounted inner and outer pinions or gears 17 and 18. The gear 17 is secured to the shaft while the gear 18 is frictionally mounted thereon and is frictionally urged against a collar or head 19 upon the end of the shaft by a spring 21. With this arrangement the gear 17 will be positively driven at all times when the shaft 16 is rotated, while the gear 18 will be frictionally driven by the shaft, and this gear will be permitted to rotate independently of the shaft if subjected to a force sufficient to overcome this friction.

Upon the shaft 15 of the time indicator is mounted a gear 22. Preferably this gear will also be frictionally mounted on its shaft so as to permit the shaft to be turned independently of the gear in order to set the timer for an interval timing operation. This frictional mounting may also be provided by a spring 23 acting against a collar 24 secured to the shaft 15, which spring presses the gear against a collar or washer 25.

It will be noted that the frictionally mounted gear 18 is at all times in mesh with the gear 22 so that if the latter gear is not driven by other means, it will be driven by the gear 18. As will be explained later, this will effect the faster rotation of the shaft 15, and provision is made for permitting the latter shaft to be rotated by this gear during that part of its rotation in which the indicator travels in a counter-clockwise direction, as shown in Fig. 1, between the numerals 15 and 0. It will be understood that as illustrated the indicator 14 is rotated in a clockwise direction to set the apparatus for an interval-timing operation, while during the actual timing the indicator rotates in a counter-clockwise direction.

As shown in Figs. 4 and 6, the positive driven gear 17 is adapted to mesh at a predetermined time with a gear 26 mounted upon a swinging arm 27, which arm is pivoted upon the shaft or axis 28 of a relatively large gear 29, the teeth of which are at all times in mesh with those of the gear 26. The arm 27 may be moved about its pivot 28 and move the gear 26 out of mesh with the gear 17, as shown in Figs. 3 and 5. While the latter two gears may be thrown in and out of mesh, it will be seen that as the gear 26 moves at all times about the rotating axis of the gear 29, the latter gear will always be in mesh with the gear 26.

Upon the shaft 28 of the gear 29 is a small gear or pinion 30 adapted to mesh with the gear 22 which, as previously stated, is frictionally mounted upon the shaft 15 of the time indicator 14.

With the above arrangement, it will be apparent that when the gear 26 is out of mesh with the gear 17, the gear train, consisting of the gears 26, 29 and 30, will be idle and the gear 22 will be driven at a relatively rapid speed by the gear 18 which is frictionally mounted on the motor shaft 16. However, when the gear 26 is in mesh with the gear 17, the gear 22 and shaft 15 will be driven through the gear train 26, 29 and 30 at a relatively slow speed. During this last movement the gear 18 will be rotated by the gear 22 but will rotate relatively to the motor shaft 16 due to its frictional connection therewith.

The arm 27 is normally urged in a counter-clockwise direction, as shown in Fig. 3, by the spring 32 secured at one end to the free end of the arm 27 and at its other end to a lug 33 on the motor casing 10, thus biasing the gear 26 toward the gear 17.

Secured to the indicator shaft 15 is a cam 34, shown more particularly in Figs. 5 and 6. This cam is adapted to engage a projection 35 at the inner side of the arm 27, and the cam surface extends over an arc of approximately 90 degrees so that during substantially 90 degrees of the movement of the shaft 15 the gear 26 will be held out of engagement with the gear 17. When, however, the cam 34 is in the position shown in Fig. 6, it will not contact the projection 35 and the spring 32 will effect engagement between the gears 26 and 17.

The timer may be provided with any appropriate signal device, such, for example, as the gong 36 illustrated in Fig. 3. A striker 37 may be pivoted on the case at 38, which striker is urged toward the gong by a spring 39 secured at one end to the striker and at its other end to the fixed lug 40. The striker 37 is also provided with an arm 41 adapted to be engaged by the teeth or prongs of a star wheel 42. The star wheel is driven by the motor through suitable gearing, not shown, and will effect intermittent sounding of the gong by causing it to be engaged by the striker. As no claim is made to the signal or operating means therefor, no further description of this structure is required.

In Fig. 1 of the drawings the indicator is shown at its zero or rest position. At this time the cam 34 is in the position shown in Fig. 5 in which the arm 27 is held outwardly by the engagement of the cam with the projection 35 so as to throw the gear 26 out of mesh with the gear 17.

To set the timer the timing indicator is turned in a clockwise direction, as shown in Fig. 1. If it is desired to time a relatively short interval, say fifteen minutes, for example, the indicator is turned until it points to the numeral 15. At this time the cam, while it has been rotated in a clockwise direction from the position shown in Fig. 5, will still engage the projection 35. When the indicator is released, it will be returned to its original position by rotation in a counter-clockwise direction by the motor. During this movement, that is during the shorter intervals of time, the indicator will be rotated at its higher speed through the frictionally mounted gear 18 and the gear 22.

If, however, it is desired to measure a longer interval of time the indicator will be turned through a further angle, and after it passes the fifteen minute indication the cam 34 will pass out of engagement with the projection 35, as shown in Fig. 6. This will permit the spring 32 to move the arm 27 inwardly and effect engagement of the gear 26 with the gear 17.

If the indicator is moved, for example, to 60 for the measurement of an interval of one hour, the part of the return movement from 60 to 15 will be effected through the gears 17, 26, 29 and 30, the latter engaging the gear 22. During this part of the movement the indicator will be operated at a slow speed, for example, approximately one third that of the higher speed. Also during this period the gear 18 which is in constant mesh with the gear 22 will be rotated idly by the latter, this being permitted by its frictional connection with the shaft 16.

When, however, the indicator reaches the numeral 15, the cam 34 will strike the projection 35 and move the arm 27 outwardly to disengage the gear 26 from the gear 17, thus rendering the gears 26, 29 and 30 inactive, and during the remainder of the return movement, that is from 15 to 0, the indicator will be actuated by the gears 18 and 22.

While I have shown and described a preferred embodiment of my invention, it will be understood that it is not to be limited to all of the details shown, but is capable of modification and variation within the spirit of the invention and within the scope of the claims.

What I claim is:

1. An interval timing mechanism comprising a driving shaft, a driven shaft, means for operating said driven shaft at different speeds during one revolution thereof comprising two trains of gearing adapted to connect the driving shaft to the driven shaft to drive the latter, the gears of one of said trains being frictionally driven and the other being positively driven from the driving shaft, and means for mounting one of the gears of said positively driven train for pivotal movement about a point eccentric to its axis into and out of mesh with a mating gear, and means responsive to the rotation of the driven shaft for moving said movable gear out of mesh with its mating gear at a predetermined point in the rotation of the driven shaft.

2. An interval timing mechanism comprising a driving shaft, a driven shaft, means for operating said driven shaft at different speeds during one revolution thereof comprising two trains of gearing adapted to connect the driving shaft to the driven shaft to drive the latter, the gears of one of said trains being constantly in mesh and frictionally driven, and the other being positively driven from the driving shaft and comprising a plurality of gears, means for mounting one of the gears of the positively driven train for swinging movement about an axis of another gear of said train to move it into and out of mesh with such other gear, and means for swinging said gear about said axis to move it out of mesh with such other gear at a predetermined point in the rotation of the driven shaft.

3. An interval timer comprising a motor having a shaft, a rotatably mounted time indicator, a gear frictionally connecting said shaft and said indicator to drive the latter frictionally from the former at a given speed, means connecting said shaft with the indicator to drive the latter at different speeds, said last-named means comprising a plurality of gears, means for mounting one of said last-named gears for pivotal movement about the axis of another of said gears to move it out of engagement with a third one of said gears, and means for moving said one gear about its pivot at a predetermined point in the rotation of said time indicator.

4. A motor having a shaft, a gear positively driven by the motor shaft, a second gear frictionally driven by the motor shaft, a rotatably mounted time indicator, an indicator-driving-gear connected to the latter and in constant mesh with said frictionally driven gear, means connecting said indicator-driving-gear with said positively driven gear, said means comprising an idler gear pivotally mounted about a point eccentric to its axis, and means responsive to the rotation of the indicator for swinging said idler gear about its pivot to connect it to and disconnect it from said positively driven gear.

5. A motor having a shaft, a gear positively driven by the motor shaft, a second gear frictionally driven by the motor shaft, a rotatably mounted time indicator, an indicator-driving-gear connected to the latter and in constant mesh with said frictionally driven gear, means connecting said indicator-driving-gear with said positively driven gear, said means comprising an idler gear pivotally mounted about a point eccentric to its axis and urged toward meshing engagement with said positively driven gear, and cam means actuated by said indicator to swing said idler gear about its pivot at a predetermined point in the rotation of the indicator to move it out of engagement with said positively driven gear.

6. An interval timer as in claim 4 wherein said idler gear is mounted on an arm and said arm is pivoted on the axis of a second idler gear, said second idler gear being in mesh with said driving gear.

7. An interval timer as in claim 4 wherein said idler gear is mounted on a pivoted arm and cam means actuated by said time indicator moves said arm at a predetermined point in the rotation of the indicator.

8. A motor having a shaft, a gear positively driven by the motor shaft, a second gear frictionally driven by the motor shaft, a rotatably mounted time indicator, an indicator-driving-gear connected to the latter and in constant mesh with said frictionally driven gear, means connecting said indicator-driving-gear with said positively driven gear, said means comprising an idler gear adapted to mesh with said positively driven gear, a pivotally mounted arm on which said idler gear is carried to swing about a point eccentric to its axis, a cam member, said indicator having a shaft upon which said cam member is secured and said cam member being adapted to engage said arm at a predetermined point in the rotation of the indicator, and move said idler gear out of mesh with said positively driven gear.

References Cited in the file of this patent

UNITED STATES PATENTS

| | | |
|---|---|---|
| 307,844 | Cottrell | Nov. 11, 1884 |
| 436,828 | Flohr | Sept. 23, 1890 |
| 927,809 | Murdock | July 13, 1909 |
| 1,960,508 | Poole | May 29, 1934 |
| 2,292,304 | Strong | Aug. 4, 1942 |
| 2,583,245 | Van Valkenburgh et al. | Jan. 22, 1952 |
| 2,620,872 | Wyman | Dec. 9, 1952 |
| 2,670,794 | Gallagher | Mar. 2, 1954 |